(12) United States Patent
Navarro

(10) Patent No.: US 12,152,559 B2
(45) Date of Patent: Nov. 26, 2024

(54) MULTI-HYDRAM TURBINE SYSTEM

(71) Applicant: Renewable Ocean Energy, Inc., Dickinson, TX (US)

(72) Inventor: Richard M. Navarro, Dickinson, TX (US)

(73) Assignee: Renewable Ocean Energy, Inc., Dickinson, TX (US)

( * ) Notice: Subject to any disclaimer, the term of this patent is extended or adjusted under 35 U.S.C. 154(b) by 0 days.

(21) Appl. No.: 17/663,741

(22) Filed: May 17, 2022

(65) Prior Publication Data

US 2022/0364540 A1   Nov. 17, 2022

Related U.S. Application Data

(60) Provisional application No. 63/189,437, filed on May 17, 2021.

(51) Int. Cl.
*F03B 13/08* (2006.01)
*F03B 15/04* (2006.01)

(52) U.S. Cl.
CPC .............. *F03B 13/08* (2013.01); *F03B 15/04* (2013.01)

(58) Field of Classification Search
CPC .......... F03B 13/08; F03B 15/04; F03B 13/00; Y02E 10/20
See application file for complete search history.

(56) References Cited

U.S. PATENT DOCUMENTS

| | | | |
|---|---|---|---|
| 8,424,300 B1* | 4/2013 | Navarro | F04B 17/00 417/331 |
| 9,127,641 B2 | 9/2015 | Navarro | |
| 10,428,786 B2 | 10/2019 | Navarro | |
| 2003/0066289 A1* | 4/2003 | Watten | F03B 13/00 60/398 |
| 2013/0205767 A1* | 8/2013 | Shinde | E02B 9/00 60/495 |
| 2019/0101095 A1* | 4/2019 | Navarro | F04B 17/00 |

OTHER PUBLICATIONS

Siddhi et al., "Classical hydraulic ram pump performance in comparison with modern hydro-turbine pumps for low drive heads", 2021, Institution of Mechanical Engineers, pp. 1463-1468 (Year: 2021).*

(Continued)

*Primary Examiner* — Carib A Oquendo
(74) *Attorney, Agent, or Firm* — Timothy G. Ackermann

(57) ABSTRACT

A hydropower system includes hydraulic ram system with a pressure vessel having a one-way inlet valve and an outlet valve controlling the release of pressurized water from the pressure vessel for use in a water turbine for providing electricity. A hydropower system may have two or more hydraulic ram systems with a first system feeding a first water turbine and a second and third system feeding a second water turbine. One or more siphons are provided to assist water flow, and an overflow pressure vessel captures and pressurizes waste water from the first hydraulic ram system for use in the third system, which releases pressurized water for the second water turbine. The second hydraulic ram system accepts spent water from the first water turbine and releases pressurized water for the second water turbine.

30 Claims, 6 Drawing Sheets

(56) References Cited

OTHER PUBLICATIONS

Thomas Allsup & Richard M. Navarro, A Better Poseidon Adventure, prior to May 2021.
Thomas Allsup & Richard M. Navarro, It's All Downhill From Here, prior to May 2021.
Renewable Ocean Energy, Inc., The Future of Hydroelectricity [presentation], prior to May 2021.
Kathy Ireland Worldwide Inc., Worldwide Business with Kathy Ireland, Renewable Energy Demoa FSA 3, Oct. 24, 2021, https://www.youtube.com/watch?v=DYS_tFn8py8, Renewable Ocean Energy, Inc.
Renewable Ocean Energy, Inc., Hydroelectric Solutions White Paper, prior to May 2021, Renewable Ocean Energy, Inc., Kahului HI.
Creative Minds Solutions, LLC, Hydroelectric Solutions White Paper, prior to May 2021, Creative Minds Solutions, LLC, Grapevine TX.

\* cited by examiner

MULTI-HYDRAM TURBINE SYSTEM

REFERENCE TO RELATED APPLICATIONS

This application claims priority to U.S. Provisional Patent Appl. No. 63/189,437 and incorporates that application in its entirety.

FIELD OF THE INVENTION

This disclosure relates generally to a hydroelectric turbine system and specifically to a hydroelectric turbine system comprising one or more hydraulic rams feeding a first turbine and one or more hydraulic rams feeding a second turbine, the system being adapted for use in both passive and active water environments.

BACKGROUND OF THE INVENTION

Hydroelectric power is the most cost-efficient form of renewable energy and is considered a mature industry as there have been few innovations in many years. Hydraulic rams ("hydrams") have been used for hundreds of years to pump water without an external source of energy. The principles of hydraulic rams will be used to amplify the source head thereby improving the energy output of the turbine through increased rotational speed. Instead of the hydram pumping the water vertically, the pressurized water is injected into a first (or main) hydroelectric turbine to rotate the turbine with greater speed than would be expected with many natural flows of water. The lower-pressure (or waste) flow from that first hydram and the discharge from the first turbine are each also amplified by a hydram. The pressurized water flows from those hydrams, and the lower-pressure (or waste) flow from those hydrams, are all injected into a second (or secondary) hydroelectric turbine.

In one aspect of the current invention, the system is adapted for use on low head active water flows such as low-head dams or streams with short-drop waterfalls. In this aspect, the system generally comprises hydram systems, hydroelectric turbines, and, optionally, an overflow pressure vessel. In a preferred embodiment, water from a low head water source travels downward through a drive pipe leading to a first hydram system, including a hydram with a chamber comprising an impulse valve and a delivery valve operating antagonistically, and a pressure vessel. Drive pipe water flow creates kinetic energy such that water pressure increases within the chamber thereby causing the impulse valve to close. The sudden stoppage of the water induces a reverse transmission of the kinetic energy causing a portion of the water to open the delivery valve and pass into a pressure vessel connected to a vertical or upwardly sloped delivery pipe. Pressurized water from the pressure vessel is directed to a power generator assembly (e.g., a water wheel and/or turbine) causing the wheel/turbine to turn and generate electric power. Water that is not delivered to the pressure vessel, at a lower pressure, is directed to an overflow pressure vessel which delivers pressurized water, via a siphon system, to a secondary hydram system, with a secondary hydram and pressure vessel system. Water exhausted from the first power generator assembly is directed to a tertiary hydram system with a tertiary hydram and pressure vessel system. The secondary and tertiary hydram systems operate in the same manner as the primary, and their outputs (pressurized water and lower pressure water) are all directed to a secondary power generator assembly.

In another aspect of the current invention, the system is adapted for use on a passive water source such as a pond, lake, stream, or ocean. In the passive water source aspect of the current invention, the system uses constant energy sources, i.e., gravity & atmospheric air pressure, to produce electricity as needed. The system of this aspect does not require batteries, poses no environmental harm or threat to marine life and may be built and operated close to shore to in order to reduce construction, operating, maintenance, and grid connection costs. The system uses an improved siphon arrangement to lift water from a passive water source, such as a pond, to power a hydroelectric turbine. The lifted water is accelerated and delivered via one or more pipes to an improved multi-hydram systems and/or a turbine. The presence of multiple pipes results in the cumulative increase of the vertical head of the water delivering kinetic energy to the turbines.

Typically, hydroelectric power is produced when water is dropped from a source (e.g., a dam or waterfall) to a turbine thereby rotating a rotor within a stator to produce electricity. Hydroelectric power plants often require the construction of a dam and the flooding of land to provide sufficient power source. This is costly and may result in the destruction of habitat, cultural artifacts, and the relocation of people. Traditional hydroelectric is also limited to areas where there is a source of flowing water and is subject to seasonal fluctuations due to evaporation and reduced rainfall. Many dams are not tall enough to provide sufficient drop for current technology and are therefore considered "non-powered" dams.

Hydraulic ram pumps (hydrams) have been successfully used since the late 1700's to lift water to a higher elevation by creating water at a higher pressure without the use of a mechanical pump. Hydrams effectively convert water energy in the form of pressurization into water energy in the form of gravitational potential energy, albeit not for all of the water. With increased interest in renewable energy that operates without an external energy source, hydraulic rams have been offered as one way to increase the mechanical advantage of falling water to drive hydroelectric turbines. As hydrams have just two moving parts, they are mechanically robust and will continue to operate indefinitely once started. Hydrams can be used to produce electricity with low-head dams.

Hydrams create water at a higher pressure than at their source, but not all of the source water is pressurized. Perhaps almost 70% of the water used is "lost" in the process of pressurizing the remaining 30%. That water does not disappear, naturally, but remains at a lower pressure and does not contribute to the pressurized flow. In a proposed embodiment, that "waste water" is routed through a secondary hydram system.

The use of a siphon permits lifting water to a higher elevation. Siphons have been successfully used since 1500 B.C. to transfer liquid from one source to another and are an established practice in many areas of hydraulic technology. Siphons have two major criteria: 1) the maximum lift is approximately 32 feet at sea level; 2) the point where the water enters the siphon must be higher than the point where the water exits the siphon. When these two criteria are met, siphons will continue to operate virtually indefinitely. Siphons work using atmospheric pressure to transfer the water from a higher source to a lower source, although the fluid in the lower source may be delivered into a greater backpressure force at discharge. Siphons also effectively convert water energy in the form of pressurization into water energy in the form of gravitational potential energy.

A pressure vessel may be used to store water at increasingly greater pressures and deliver it at that higher pressure. A pressure vessel may use a sealed vessel with at least one inlet and one outlet, and with a trapped bolus of gas, so that the gas cannot escape. The gas bolus may be above the outlet and/or may be sealed into a flexible sealed chamber, such as an elastic container, or separated from the water by a diaphragm. The pressure vessel inlet may use some form of a one-way or check valve, such that the inlet valve only permits water into the system. The pressure valve outlet may operate so that it does not permit the gas bolus to escape, and so that it only allows water to exit the pressure vessel if above a certain pressure, such as a pressure relief valve. The pressure valve outlet may also operate as a servo-controlled valve that opens at one pressure and closes at a second, lower, pressure, such as a closed cycle servosystem. The combination of increased head resulting from a hydram system and the pressure vessel can increase the pressure substantially, such as from the original head of a low-head dam, about 30 feet, to about 160 or more feet.

SUMMARY OF THE INVENTION

In the active water hydroelectric system, the system uses the principles of a hydraulic ram pump ("hydram") to increase the pressure to turbine blades using water from a water source such as low head run-of-the river dam of about 30 or less in height. Generally, the system comprises a housing, a low head water source, a marine and debris filter, a first (or primary) hydram system, an overflow pressure vessel system, a primary hydroelectric turbine with generator, a second (secondary) hydram system and a third (tertiary) hydram system, and a secondary hydroelectric turbine with generator, and an exhaust. The first hydram system includes a primary drive pipe, primary T-pipe, primary impulse valve, primary delivery valve, primary pressure vessel, primary outlet servo valve ("primary release valve"), primary waste pipe, and primary turbine delivery pipe. The primary drive pipe is fluidly coupled to the low head water source comprising water on one end and passing through the marine and debris filter. On the other end, the water is fluidly coupled to the primary drive impulse valve ("primary impulse valve") and primary pressure vessel delivery valve ("primary delivery valve") located below the pressure vessel to create a hydraulic ram pump (hydram).

In a hydram, the impulse and delivery valves serve as logic gates as they alternately start and stop the flow of water to trigger the hammer effect. The active water hydroelectric system uses the reversed kinetic energy of the "water hammer" effect to inject water into the pressure vessel through the delivery valve. In a traditional hydram, pumping efficiency ranges from 60-80% but volumetric efficiency is limited by the ratio of the source head to a discharge head. In a preferred embodiment, as the water fills the pressure vessel, the gas bolus within the pressure vessel is compressed similar to the process of a traditional well pump. When the pressure within the vessel reaches a desired sufficiently elevated pressure, such as 70 pounds per square inch (psi), the pressure within the tank is equivalent to that of a dam 162 feet tall. At such a desired pressure, the outlet servo valve (release valve) releases the pressurized water to rotate the hydroelectric turbine. The release valve, which in a preferred embodiment is servo-controlled, then closes when the pressure within the vessel reaches a desired sufficiently reduced pressure, such as 65 pounds per square inch (psi). In a preferred embodiment, the primary drive pipe is sloped to maximize the acceleration of the water from gravity at the rate of 9.8 m/sec2 and has proportional length and diameter to provide sufficient water to drive two generators. Approximately 30% of the water flow will be directed to the primary turbine and approximately 70% of the water flow will be directed to rotation of a secondary turbine.

The primary impulse valve is normally open and allows the water passing through the primary impulse valve to flow vertically upwards. When the flow of water reaches critical velocity, it creates pressure against this valve that forces it to close. This causes an immediate blockage to the kinetic energy and ceases the flow of water down the drive pipe; thereby causing the kinetic energy from the flow of water to be reversed and equally applied to all components along the entire fluidly coupled system that are not isolated by a valve or pressure vessel. Near the lower end of the primary drive pipe at the bottom of the primary pressure vessel is the primary delivery valve that is normally closed and fluidly connected to the primary impulse valve. The primary T-pipe fluidly connects the primary impulse valve to the primary delivery valve and to the primary drive pipe; the "T" may be formed at a right angle or at other non-right angles and is a reference to it being a 3-way junction. The kinetic energy from the abrupt cessation of the water flow at the impulse valve results in a positive and negative pressure wave to be set up in the water. The positive pressure component results in the brief opening of the primary delivery valve (which operates as a check valve preventing flow out of the pressure vessel) and the injection of water into the pressure vessel. This cycle repeats itself over and over with alternating opening and closing of the reciprocal valves and the injection of water into the pressure vessel. The water from the drive pipe creates a velocity head due to gravitational acceleration, and increased kinetic energy, of the water from the entrance to the terminus at the primary impulse valve. As this valve closes, the kinetic energy of the accelerated water reverses the flow of water resulting in the momentary opening of the primary delivery valve and the injection of the accelerated water upward into the pressure vessel through the delivery valve. The maximum positive and negative pressure components of the kinetic energy is determined by the velocity head from the drive pipe.

Approximately 30% of the water flowing down the drive pipe is injected into the pressure vessel so that over multiple cycles, this vessel fills with water and the pressure within the vessel increases as the gas bolus within the vessel is compressed. The water in the pressure vessel is stored until it reaches a desired pressure to drive the turbine which may be located at a higher elevation. That desired pressure is associated with the upper pressure setting (to open the valve) of the release valve, and the lower pressure setting (to close the valve) of the release valve. Increased water pressure results in an increase in the revolutions per minute (rpm) of the blades.

In a traditional hydram, the approximately 70% of the water flowing down the drive pipe through the primary impulse valve is normally not pressurized or injected into the pressure vessel, but instead travels at a lower pressure down the primary waste pipe and discharged. In this embodiment, the water is not wasted as it represents the input flow of water for the second hydram system and the consequent generation of electricity from the second generator and may be designated as "hydram discharged water."

Prior to delivery to the second hydram system, in a preferred embodiment, the discharged water from the primary hydram system is first delivered to an overflow pressure vessel system. An overflow pressure vessel system includes a pressure vessel operating similarly to those described above, and optionally includes a siphon system on the outlet side. An overflow pressure vessel system may include an overflow pressure vessel, an overflow delivery valve (inlet valve), an overflow release valve (outlet), and a siphon connected to the overflow delivery valve. An overflow pressure vessel may use a sealed rigid or substantially rigid vessel with at least one inlet and one outlet, and with a trapped bolus of gas, so that the gas cannot escape. The gas bolus may be above the outlet and/or may be sealed into a flexible sealed chamber, such as an elastic container, or separated from the water by a diaphragm. An exemplary pressure for a flexible sealed chamber is 20 psi. The pressure vessel inlet may use some form of a one-way or check valve, such that the inlet valve only permits water into the system. The pressure valve outlet may operate so that it does not permit the gas bolus to escape, and so that it only allows water to exit the pressure vessel if above a certain pressure, such as a pressure relief valve. The pressure valve outlet may also operate as a servo-controlled valve that opens at one pressure and closes at a second, lower, pressure, such as a closed cycle servosystem. The water released from the overflow pressure vessel by the overflow release valve is delivered into the inlet of a siphon, which uses that pressure to lift the water to a desired height (limited by the incoming pressure) and then delivering it to the secondary hydram system via the secondary drive pipe.

The delivery pipe water is fluidly coupled to the turbine blades of a hydroelectric turbine thereby inducing rotation of the blades of the primary turbine which, in turn, induces rotation of a turbine shaft connecting to a stator within the first generator. As the rotors are subsequently rotated within the magnetic field of a first generator, an electrical current is created and allowed to pass through a conductor to the grid, storage (i.e., battery), or be used in an electrical device. A variety of turbine-generator combinations may be used depending on the amount of electricity sought and the volume of water flow available. After rotating the turbine, the water is then exhausted from the primary turbine via a primary turbine exhaust pipe (or spent water pipe). This flow of water represents the turbine spent water flow that has lost most of its energy in the process of rotating the turbine. Gravity forces it to flow with reduced velocity to the third hydram system through a downwardly angled pipe. As it flows, the spent water undergoes gravitational acceleration before it is delivered to the third hydram system where it represents the input flow of water.

The second hydram system comprises a secondary drive pipe, secondary T-pipe, secondary impulse valve, secondary delivery valve, secondary pressure vessel, secondary outlet servo valve ("secondary release valve"), secondary turbine delivery pipe, secondary waste pipe. The secondary drive pipe is fluidly coupled to the primary waste pipe of the first hydram system (preferably via the overflow pressure vessel system). On the other end, the water is fluidly coupled to the secondary drive impulse valve ("secondary impulse valve") and secondary pressure vessel delivery valve ("secondary delivery valve") located below the pressure vessel to create a hydram. The second hydram system creates, in the manner described above for the first hydram system, a pressurized flow of water from the secondary pressure vessel via the secondary release valve and secondary delivery pipe and a flow of water via the secondary waste pipe. Both of these flows of water are fluidly coupled to the turbine blades of the secondary turbine for inducing rotation of its blade for generating power.

The third hydram system comprises a tertiary drive pipe, tertiary T-pipe, tertiary impulse valve, tertiary delivery valve, tertiary pressure vessel, tertiary outlet servo valve ("tertiary release valve"), tertiary turbine delivery pipe, and tertiary waste pipe. The tertiary drive pipe is fluidly coupled to the primary turbine exhaust pipe. On the other end, the water is fluidly coupled to the tertiary drive impulse valve ("tertiary impulse valve") and tertiary pressure vessel delivery valve ("tertiary delivery valve") located below the pressure vessel to create a hydram. The third hydram system creates, in the manner described above for the first hydram system, a pressurized flow of water from the tertiary pressure vessel via the tertiary release valve and tertiary delivery pipe and a flow of water via the tertiary waste pipe. Both flows of water are fluidly coupled to the turbine blades of the secondary turbine for inducing rotation of its blade for generating power.

In a passive hydroelectric system, the system comprises one or more active hydroelectric systems housed on or adjacent to a water source. In this embodiment, however, a vertical siphon pipe and vector siphon pipe comprise a siphon mechanism to serve as the water source rather than flowing water from a low-head dam used in the active water system. In an embodiment, a plurality of siphon mechanisms, hydrams, and hydroelectric turbines with associated housing are all located on a barge or ship. Assuming there is sufficient water from a given source, the plurality of siphon mechanisms allows for adjusting the amount of water being delivered to a given turbine. Within a hydroelectric system, the amount of electricity produced is the result of the inter-active action of the total head and the total amount of water delivered to the turbine.

The operation of this device allows for a variety of alternative embodiments. In one such embodiment, the passive water system could be located on shore with the siphon mechanism drawing and returning the water to the source. In another, it could be located on a structure on the water, such as a fixed or floating platform, or on an anchored or moored or free-floating structure such as a ship or barge.

In an embodiment, a passive water hydroelectric system uses the principles of a hydraulic ram pump ("hydram") to increase the pressure to turbine blades using water drawn via a siphon from any water source. Generally, the system comprises a housing, a water source, a marine and debris filter, a first (or primary) hydram system, an overflow pressure vessel system, a primary hydroelectric turbine with generator, a second (secondary) hydram system and a third (tertiary) hydram system, and a secondary hydroelectric turbine with generator, and an exhaust. In this case, the housing may be on-shore, or on a water-based platform, either fixed, such as a drilling platform, or on a free-floating platform, and supports and protects the other components.

In another embodiment, hydroelectric system uses the principles of a hydraulic ram pump ("hydram") to increase the pressure to turbine blades using water drawn via a siphon from any water source and is packaged into a shipping container or containerized system. Generally, the system comprises a containerized housing system, a marine and debris filter, a first (or primary) hydram system, an overflow pressure vessel system, a primary hydroelectric turbine with generator, a second (secondary) hydram system and a third (tertiary) hydram system, and a secondary hydroelectric turbine with generator, and an exhaust. In this embodiment, the marine and debris filter and exhaust are preferably attached by fluid couplings to the containerized housing system, which contains and supports the remaining components. In an embodiment, the containerized housing system may comprise one or more shipping containers modified to support and protect those components, which may be distributed among containers, and connected by fluid couplings.

The vertical siphon pipe and vector siphon drive pipe are hollow tubular members and comprise a siphon mechanism to lift the water from the passive water source. In an embodiment, each active water system uses as many as eight respective siphon mechanisms for each primary generator system. However, a greater or lesser number of siphon mechanisms may be used. The sum of the total number of siphon mechanisms for each individual system contribute to the total amount of water ultimately flowing to the primary turbine. The velocity head from each siphon system is increased by the active water system previously described and used to increase the rotational speed of the turbine.

In an embodiment, the vertical siphon pipe of the preferred embodiment has an overall length of 30 feet; however, the total length of the vertical pipes cannot be greater 32 feet which is the maximum height water may be lifted using atmospheric pressure only. The water source, such as the surface of a lake or the ocean, is compressed by atmospheric pressure (e.g., 14.7 pounds per square inch at sea level). An open lower end of each vertical siphon pipe projects into the free water source so that this lower end is continuously below the surface of the water source and is, ideally, covered by a marine filter to restrict marine life from entering the system.

To initiate the flow of water up the siphon mechanism, it is necessary to either create a negative pressure within the system or to prime it with water. A siphon initiator such as a vacuum pump may be used to make the pressure within each vertical siphon and vector siphon drive pipes negative with respect to the water source surface pressure (atmospheric pressure), so that the water is pushed up the vertical siphon pipe by atmospheric pressure to approximately 30 feet. At this level, the atmospheric pressure is generally not sufficient to push the water higher. Therefore, the elevated water will succumb to gravity which is the stronger force at 30 feet and cause the water to flow down the vector siphon pipe (fluidically connected to the primary drive pipe) and toward the first hydram. As the water passes through the vector siphon pipe it accelerates in concert with gravitational energy and creates a velocity head at the hydram located at the lower end of the primary drive pipe.

A conventional siphon is used to draw the water upwards. Siphons operate by inducing a pressure within a pipe that is less than the atmospheric pressure outside of the pipe. In this way, the partial vacuum created within the pipe allows the water to flow into the pipe to a maximum height determined by the atmospheric pressure in the locality with the requirement that the vertical end of the discharge pipe must be lower than the entrance point of the pipe. At sea level the standard atmosphere (atm) is a unit of pressure defined as 101,325 Pa, 1,013.25 hPa, or 1,013.25 mbar, which is equivalent to 760 mm Hg, 29.9212 inches Hg, or 14.696 psi. Using the formula that 1 psi will raise water to a level of approximately 2.31 feet, the presence of 14.696 psi will raise water to a level of approximately 33.95 feet or 10.34 meters. Accordingly, a siphon implemented in the passive water hydroelectric system will raise the water to a height of 10.34 m as long as the primary impulse valve of the of the hydram is below the level of the siphon entrance point. The siphoned water is delivered to the primary hydram for acceleration of the water flow and the pressurization of the water flow from reversal of the kinetic energy of the primary impulse valve closure.

An important consideration is that each vertical siphon pipe's entrance opening is higher than the open lower end of each vector siphon drive pipe to insure continuous flow via the siphon mechanism.

Alternatively, a mechanical pump may be used to prime the siphon system with water to initiate flow.

In the active water system, strategic placement of all components will be necessary to ensure that gravity is used to flow the water through all components. Since the hydram elevates the water height, the primary turbine may be located higher than the primary hydram and the primary turbine must be higher than the secondary turbine which, in turn, must be placed higher than the original water source to flow the water back to the source without a mechanical pump.

There are distinctions between the active and passive water systems. In the active water embodiment, the water source is flowing water from a low head dam versus the passive water embodiment where the water source is a passive water source such as a levee, river, pond, lake, or ocean where the water to drive the hydram is lifted via a siphon system or is provided from below the surface of the water to a hydram that is even farther down. The passive water system does not use ocean currents, tidal energy or ocean temperature inversions to drive the turbines. Secondly, the active water embodiment may be configured to match the water source. For a larger water source such as the ocean where the water source is virtually infinite, greater watts of power can be produced. For locations with a relatively small source of water (e.g., irrigation pond), fewer watts of electricity power will be produced. In both active and passive water designs, the water is returned without significant environmental implications.

Both active and passive water systems have the advantages of traditional hydroelectric systems; however, the passive water system avoids or lessens the disadvantages such as the need to create a dam or reservoir, fluctuating power output during times of drought, fish kill, or the disruption of land and marine ecosystems.

In some embodiments, the lower opening of the vertical siphon pipe may be coupled to a flexible section to ensure that it is always below the surface of the water yet higher than the lowest opening of the vector drive pipe to insure continuous operation of the siphon mechanism. The turbines may be located higher than the surface of the water source as the hydraulic ram has lifted the water to the turbine. The higher elevation will facilitate the exiting water to flow downward to the secondary turbine and to be re-deposited into the source via the flows previously described.

DETAILED DESCRIPTION

Figure 1:
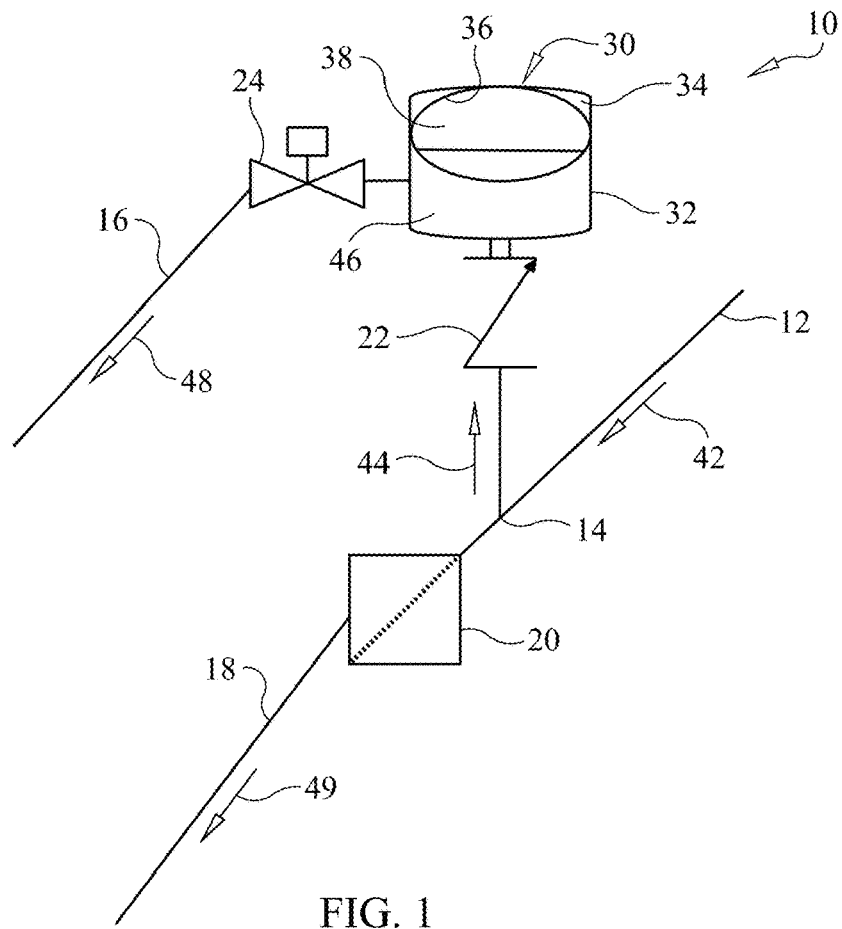
FIG. 1 shows a schematic view of a first embodiment of the invention.

For a first embodiment, we refer to FIG. 1. Hydram system 10 comprises drive pipe 12, T-pipe 14, impulse valve 20, delivery valve 22, pressure vessel 30, release valve 24, delivery pipe 16, and waste pipe 18. Impulse valve 20 is a valve that closes sharply during flow such that it creates a sudden stoppage of the water in the valve and a reverse transmission of the kinetic energy causing a portion of the water to open delivery valve 22 and pass into pressure vessel 30. Delivery valve 22 is a check valve that is normally closed and only permits water into pressure vessel 30. Release valve 24 is a servo-controlled valve that opens at one pressure and closes at a second, lower, pressure. Pressure vessel 30 comprises sealed vessel 32 (preferably a steel vessel) enclosing fluid chamber 34 and flexible sealed chamber 36, with flexible sealed chamber 36 containing gas bolus 38. Gas bolus 38 in sealed chamber 36 acts to collect pressure energy and apply pressure to the fluid in fluid chamber 34. T-pipe 14 fluidly connects drive pipe 12 to both impulse valve 20 and to delivery valve 22. Impulse valve 20 fluidly connects T-pipe 14 to pressure vessel 30, which connects T-pipe 14 to release valve 24 (via fluid chamber 34), and then to delivery pipe 16. Drive pipe 12 is fluidly coupled to a source of water, delivery pipe 16 is fluidly coupled to the inlet of a turbine-generator system, and waste pipe 18 may be connected to an overflow pressure vessel or to the inlet of a turbine-generator system.

Hydram system 10 operates by intake water flow 42 flowing down drive pipe 12, operating as an inlet, through T-pipe 14 and to impulse valve 20 which is normally open to waste pipe 18. The drop vertical creates a velocity head due to gravitational acceleration and increased kinetic energy in intake water flow 42. When intake water flow 42 reaches critical velocity, it creates pressure against impulse valve 20 that forces it to close. This causes an immediate blockage of intake water flow 42 and ceases that flow down drive pipe 12. This causes the kinetic energy from intake water flow 42 to be redirected as pressurizing flow 44 upward via T-pipe 14 to delivery valve 22 that is normally closed and fluidly connected to pressure vessel 30. Pressurizing flow 44 flows via a brief opening of one-way delivery valve 22 and forces pressurized water into pressure vessel 30. After a brief opening of delivery valve 22, impulse valve 20 opens, the pressure in T-pipe 14 drops, and delivery valve 22 closes. This permits intake water flow 42 to resume, including down waste pipe 18 (operating as an outlet) as waste water flow 49. The cycle then repeats. Pressurized water 46 in pressure vessel 30 is maintained under pressure by closed delivery valve 22, and closed release valve 24, and sealed chamber 36 applying pressure to pressurized water 46 in fluid chamber 34. Pressurized water 46 is released from pressure vessel 30 to delivery pipe 16 (operating as an outlet) as turbine water flow 48 by maintaining delivery valve 22 closed and opening release valve 24. Release valve 24 opens via automatic servo control when pressurized water 46 within pressure vessel 30 reaches a desired sufficiently elevated pressure, such as 70 psi, then closes via automatic servo control when pressurized water 46 reaches a desired sufficiently reduced pressure, such as 65 psi. Pressure vessel 30, together with delivery valve 22 and release valve 24, thus accumulate, store, and release, pressurized water.

Figure 2:
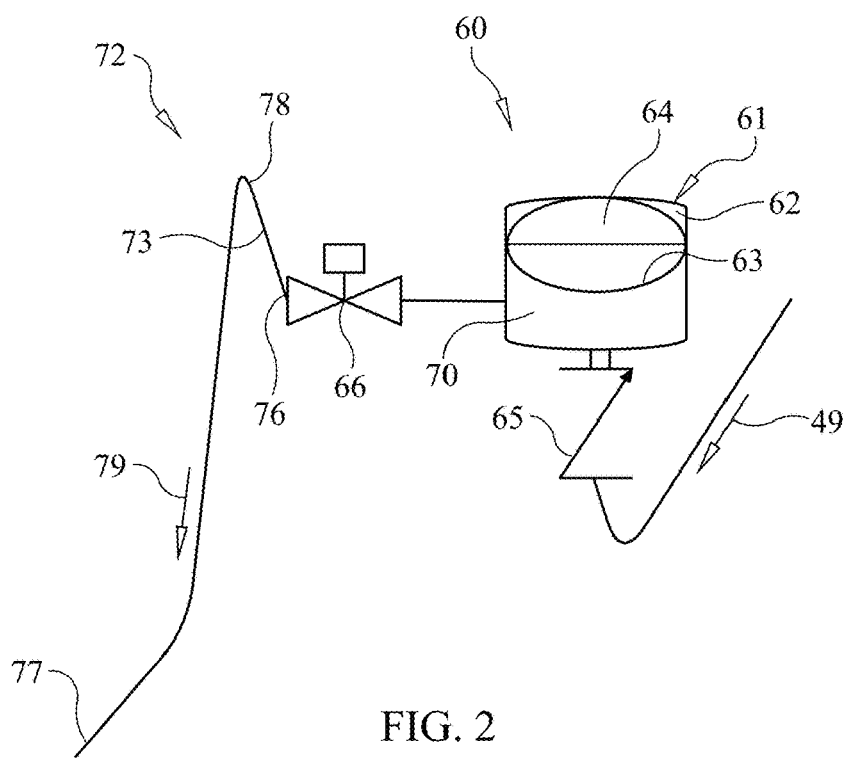
FIG. 2 shows a schematic view of a portion of a second embodiment of the invention.
Figure 3:
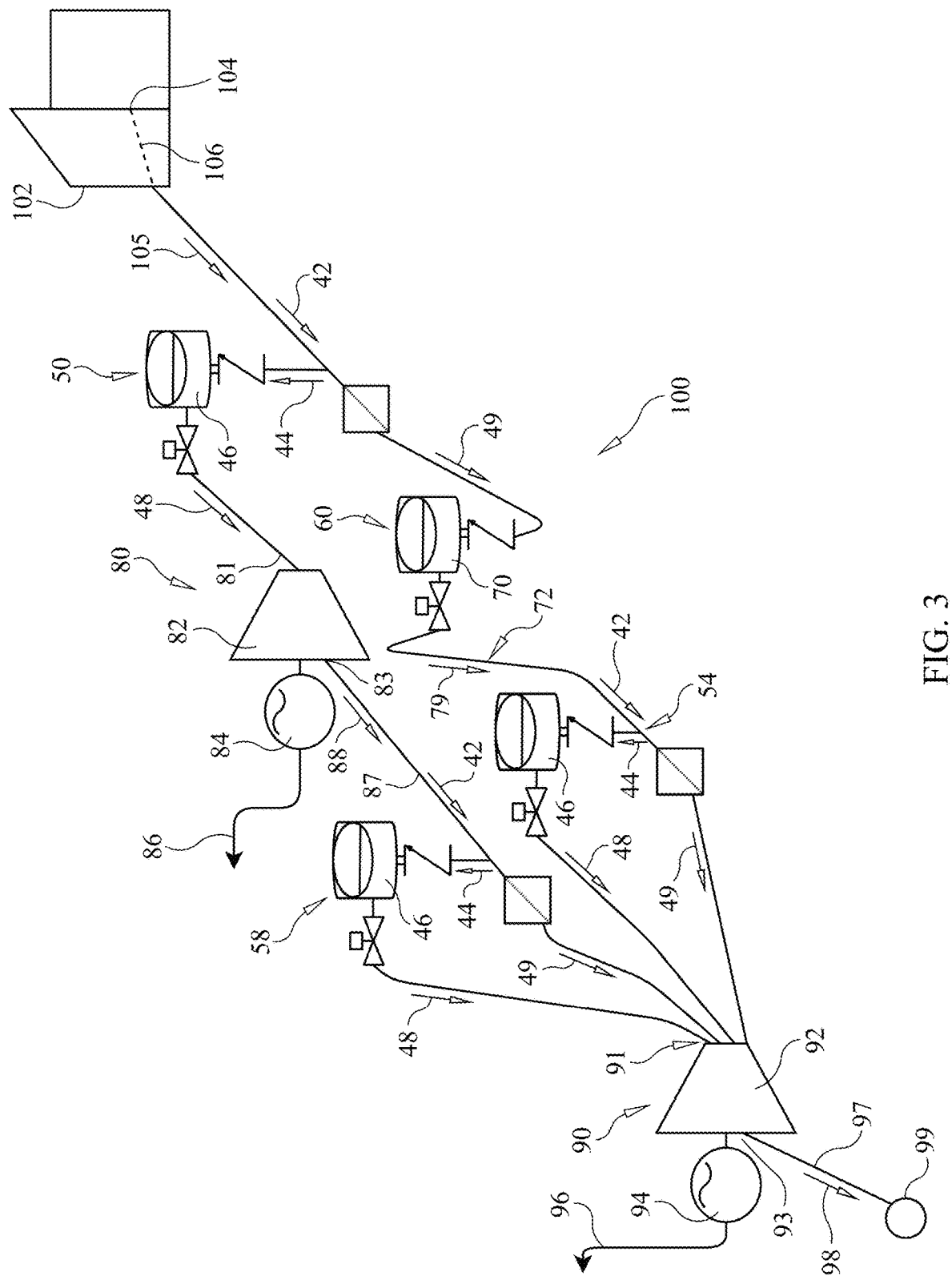
FIG. 3 shows a schematic view of a second embodiment of the invention.

For a second embodiment, reflecting an active water multi-hydram system, we refer to FIGS. 1, 2 & 3. Active water system 100 comprises low head water source 102, primary hydram system 50, overflow pressure vessel system 60, primary hydroelectric turbine-generator system 80, secondary hydram system 54, tertiary hydram system 58, secondary hydroelectric turbine-generator system 90, and exhaust 99.

Primary hydram system 50, secondary hydram system 54, and tertiary hydram system 58 are each a structure according to hydram system 10 above, and function in the manner so described.

Overflow pressure vessel system 60 comprises sealed vessel 61, overflow inlet valve 65, overflow outlet valve 66, and siphon 72. Sealed vessel 61, preferably a steel or other rigid vessel, encloses fluid chamber 62 and flexible sealed chamber 63, with flexible sealed chamber 63 containing gas bolus 64. Gas bolus 64 in sealed chamber 64 acts to collect pressure energy and apply pressure to overflow water 70 fluid in fluid chamber 62. Overflow inlet valve 65 is a check valve akin to delivery valve 22 that is normally closed and only permits water into overflow pressure vessel system 60 via an overflow inlet. Overflow inlet valve 65 receives waste water flow 49 from waste pipe 18 of primary hydram system 50. Overflow outlet valve 66 is a servo-controlled valve that opens at one pressure and closes at a second, lower, pressure, akin to release valve 24. Overflow pressure vessel system 60, including sealed vessel 61, overflow inlet valve 65, and overflow outlet valve 66, acts in a similar manner as pressure vessel 30 to accumulate, store, and release, pressurized water. Overflow outlet valve 66 delivers overflow water 70 via an overflow outlet to intake 76 of siphon 72. Siphon 72 lifts overflow water 70 to lift point 78 via lift pipe 73 and then delivers siphoned flow 79 to outlet 77 of siphon 72 (note that lift point 78 is not shown to scale in FIG. 2). Outlet 77 is located below intake 76 and, in turn, fluidly connects to drive pipe 12 of secondary hydram system 54. During the drop between lift point 78 and outlet 77, siphoned flow 79 acquires velocity head due to gravitational acceleration and increased kinetic energy.

Primary hydroelectric turbine-generator system 80 includes water turbine 82 rotationally coupled to generator 84 and delivering electricity via power connection 86. Water turbine 82 accepts turbine water flow 48 at fluid inlet (input) 81 from delivery pipe 16 of primary hydram 50, and discharges spent water 88 at fluid outlet (output) 83 via spent water pipe 87 to drive pipe 12 of secondary hydram system 54 as intake water flow 42.

Secondary hydroelectric turbine-generator system 90 includes water turbine 92 rotationally coupled to generator 94 and delivering electricity via power connection 96. Water turbine 92 accepts turbine water flows 48 from secondary and tertiary hydram systems 54 and 58 at fluid inlet (input) 91 via delivery pipes 16 thereof, as well as waste water flows 49 from secondary and tertiary hydram systems 54 and 58 down waste pipes 18 thereof, and discharges spent water 98 at fluid outlet (output) 93 via spent water pipe 97 to exhaust 99.

Low head water source 102 includes marine and debris filter 104 protecting source flow 105 through source pipe 106, which is fluidly connected to drive pipe 12 of primary hydram system 50.

Exhaust 99 accepts spent water 98 from secondary hydroelectric turbine-generator system 90 and discharges it to the environment.

In operation of active water system 100, low head water source 102 supplies source flow 105 through source pipe 106 and via marine and debris filter 104 to drive pipe 12 of primary hydram system 50 as intake water flow 42.

In primary hydram system 50, the process follows the description above for hydram system 10, resulting in waste water flow 49 from waste pipe 18, which is delivered to overflow inlet valve 65 of overflow pressure vessel system 60, and turbine water flow 48—at an increased pressure—from delivery pipe 16 from primary hydram system 50, which is delivered to water turbine 82 of primary hydroelectric turbine-generator system 80.

Turbine water flow 48 drives water turbine 82 and the rotationally coupled generator 84 and creates electricity which is delivered via power connection 86. Water turbine 82 discharges spent water 88 via spent water pipe 87 to drive pipe 12 of secondary hydram system 54 as intake water flow 42.

In tertiary hydram system 58, the process follows the description above for hydram system 10, resulting in waste water flow 49 from waste pipe 18 and turbine water flow 48—at an increased pressure—from delivery pipe 16, which are each delivered to water turbine 92 of secondary hydroelectric turbine-generator system 90.

In overflow pressure vessel system 60, the system follows the description above, resulting in siphoned flow 79 with a velocity head and increased kinetic energy due to gravitational acceleration down siphon 72, which is delivered to drive pipe 12 of secondary hydram system 54 as intake water flow 42.

In secondary hydram system 54, the process follows the description above for hydram system 10, resulting in waste water flow 49 from waste pipe 18 and turbine water flow 48—at an increased pressure—from delivery pipe 16, which are each delivered to water turbine 92 of secondary hydroelectric turbine-generator system 90.

Turbine water flows 48 and waste water flows 49 drive water turbine 92 and the rotationally coupled generator 94 and creates electricity which is delivered via power connection 96. Water turbine 92 discharges spent water 98 via spent water pipe 97 to exhaust 99.

Exhaust 99 discharges spent water 98 to the environment.

Figure 4:
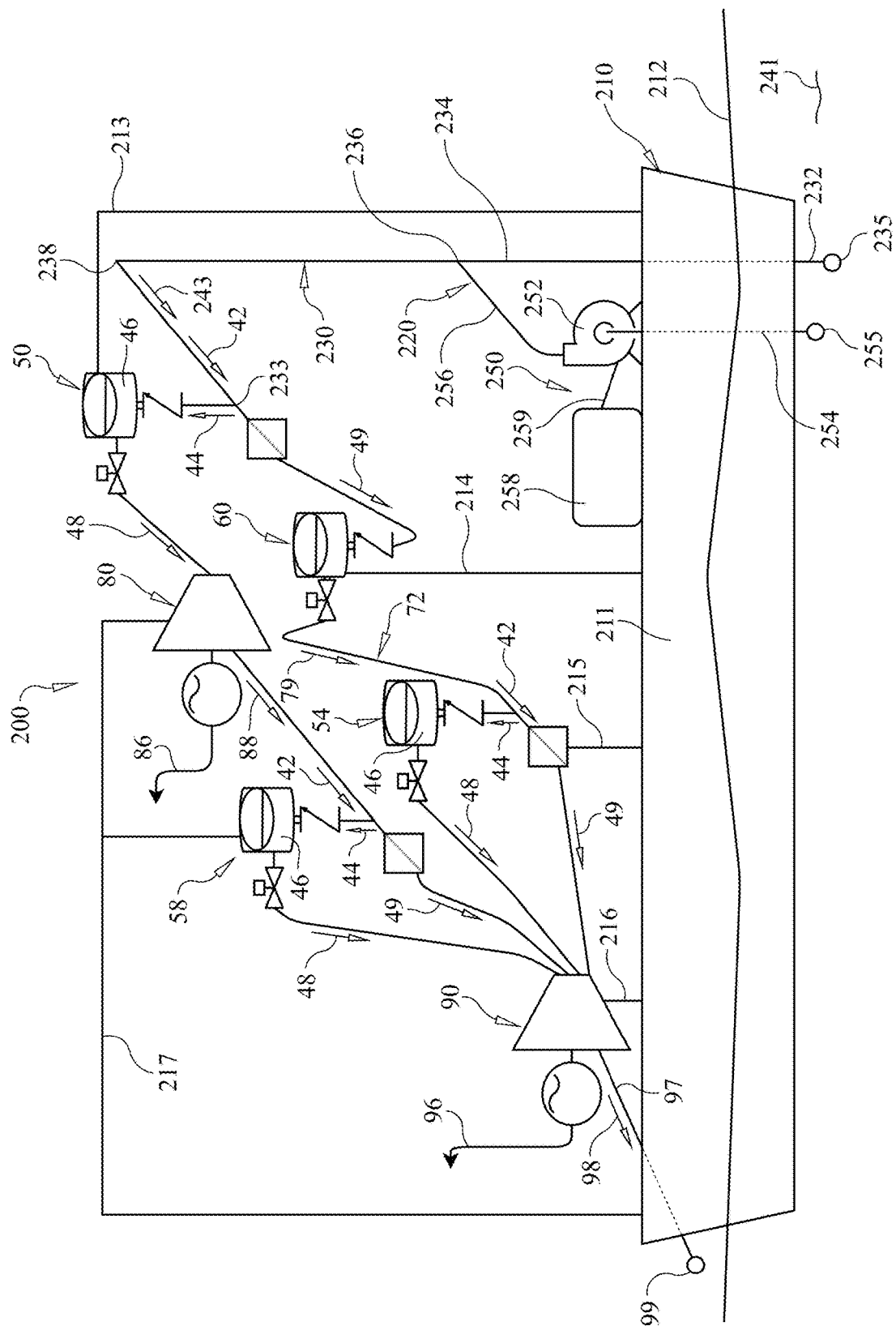
FIG. 4 shows a schematic view of a third embodiment of the invention.

For a third embodiment, reflecting a passive water multi-hydram system, we refer to FIGS. 1, 2 & 4. Passive water system 200 comprises floating structure 210, siphon system 220, primary hydram system 50, overflow pressure vessel system 60, primary hydroelectric turbine-generator system 80, secondary hydram system 54, tertiary hydram system 58, secondary hydroelectric turbine-generator system 90, and exhaust 99.

Primary hydram system 50, secondary hydram system 54, and tertiary hydram system 58, overflow pressure vessel system 60, primary hydroelectric turbine-generator system 80, secondary hydroelectric turbine-generator system 90, and exhaust 99, are each a structure according to active water system 100 above and in FIG. 3, and function in the manner so described.

Floating structure 210 (which could be, e.g., a boat, barge, anchored platform) includes hull 211 floating on water 212, and supports siphon system 220, primary hydram system 50, overflow pressure vessel system 60, primary hydroelectric turbine-generator system 80, secondary hydram system 54, tertiary hydram system 58, secondary hydroelectric turbine-generator system 90, and exhaust 99. Supports can take many forms known to persons of skill in the art, but are shown here as brackets 213, 214, 215, 216, and 217 supporting, respectively, primary hydram system 50, overflow pressure vessel system 60, secondary hydram system 54, secondary hydroelectric turbine-generator system 90, and both of primary hydroelectric turbine-generator system 80 and tertiary hydram system 58.

Siphon system 220 includes main siphon assembly 230, and priming pump assembly 250. Siphon system 220 is mounted on hull 211, but it or its components could also be supported by brackets or other structures known to persons of skill in the art. Main siphon assembly 230 includes intake 232, outlet 233, lift pipe 234, marine and debris filter 235, priming junction 236, and lift point 238. Main siphon assembly 230 lifts passive water 241 through filter 235 to lift point 238 via intake 232, lift pipe 234, and priming junction 236, and then delivers siphoned flow 243 to outlet 233. Intake 232, outlet 233, lift pipe 234, marine and debris filter 235, and priming junction 236 could be present in multiples (i.e., in parallel) to provide increased flow into primary hydram system 50, as could siphon system 220. Outlet 233 is located below intake 232 and, in turn, fluidly connects to drive pipe 12 of primary hydram system 50 (note that vertical relationship of outlet 233 and intake 232 are not shown to scale in FIG. 3). Priming pump assembly 250 includes pump 252, intake line 254 with filter 255, priming line 256, solar cell 258, and electrical connection 259. Priming pump assembly 250 primes main siphon assembly 230 by pumping passive water 241 via intake line 254 to priming line 256 and into lift pipe 234 via priming junction 236, and is powered by solar cell 258, which is connected to pump 252 by electrical connection 259.

In operation of passive water system 200, main siphon assembly 230 lifts passive water 241 through filter 235 to lift point 238 via intake 232, lift pipe 234, and priming junction 236, and then delivers siphoned flow 243 to outlet 233 and intake water flow 42.

In primary hydram system 50, the process follows the description above for hydram system 10, resulting in waste water flow 49 from waste pipe 18, which is delivered to overflow inlet valve 65 of overflow pressure vessel system 60, and turbine water flow 48—at an increased pressure— from delivery pipe 16 from primary hydram system 50, which is delivered to water turbine 82 of primary hydroelectric turbine-generator system 80.

Turbine water flow 48 drives water turbine 82 and the rotationally coupled generator 84 and creates electricity which is delivered via power connection 86. Water turbine 82 discharges spent water 88 via spent water pipe 87 to drive pipe 12 of secondary hydram system 54 as intake water flow 42.

In tertiary hydram system 58, the process follows the description above for hydram system 10, resulting in waste water flow 49 from waste pipe 18 and turbine water flow 48—at an increased pressure—from delivery pipe 16, which are each delivered to water turbine 92 of secondary hydroelectric turbine-generator system 90.

In overflow pressure vessel system 60, the system follows the description above, resulting in siphoned flow 79 with a velocity head and increased kinetic energy due to gravitational acceleration down siphon 72, which is delivered to drive pipe 12 of secondary hydram system 54 as intake water flow 42.

In secondary hydram system 54, the process follows the description above for hydram system 10, resulting in waste water flow 49 from waste pipe 18 and turbine water flow 48—at an increased pressure—from delivery pipe 16, which are each delivered to water turbine 92 of secondary hydroelectric turbine-generator system 90.

Turbine water flows 48 and waste water flows 49 drive water turbine 92 and the rotationally coupled generator 94 and creates electricity which is delivered via power connection 96. Water turbine 92 discharges spent water 98 via spent water pipe 97 to exhaust 99.

Exhaust 99 discharges spent water 98 to the environment.

Figure 5:
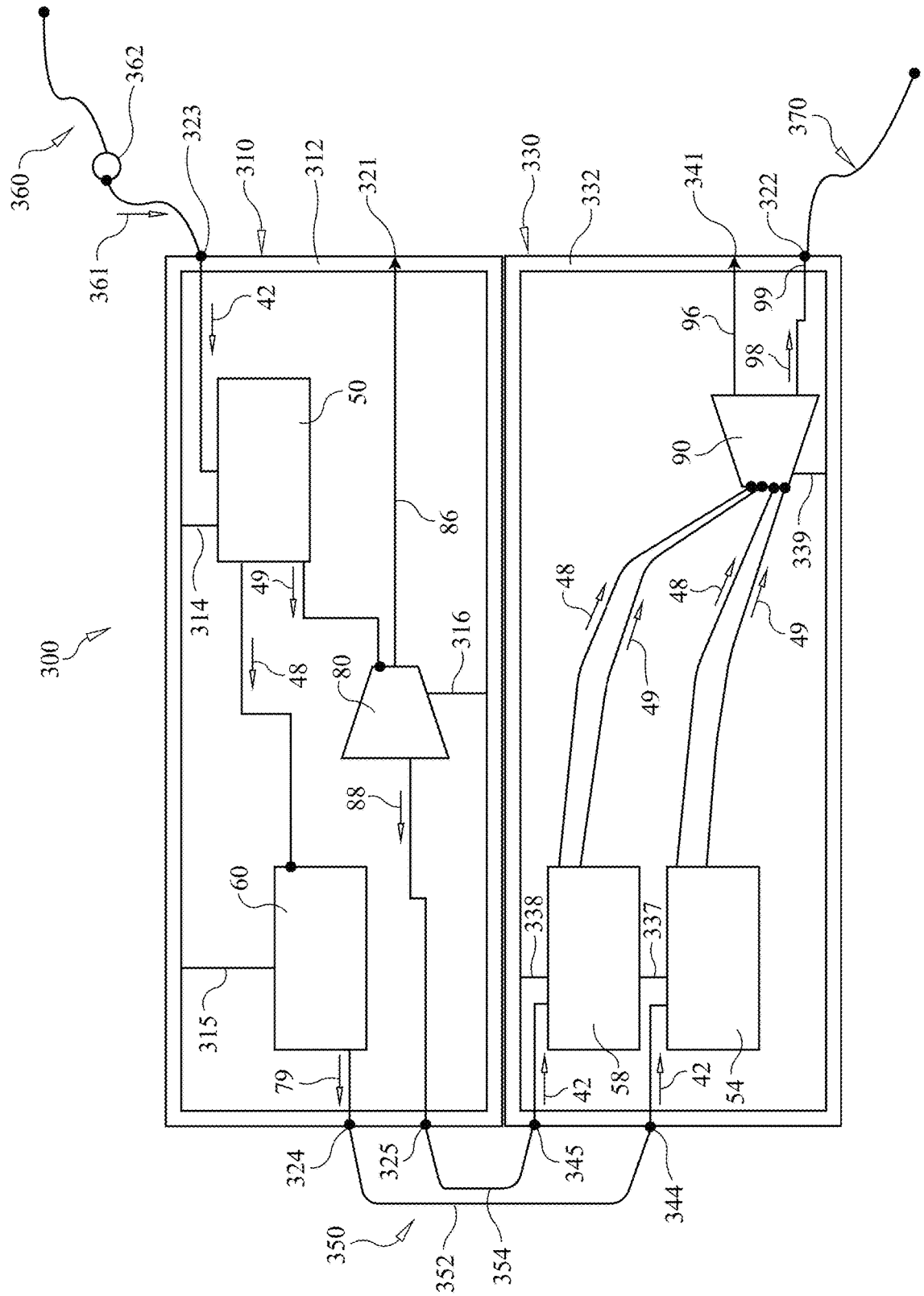
FIG. 5 shows a schematic view of a fourth embodiment of the invention.
Figure 6:
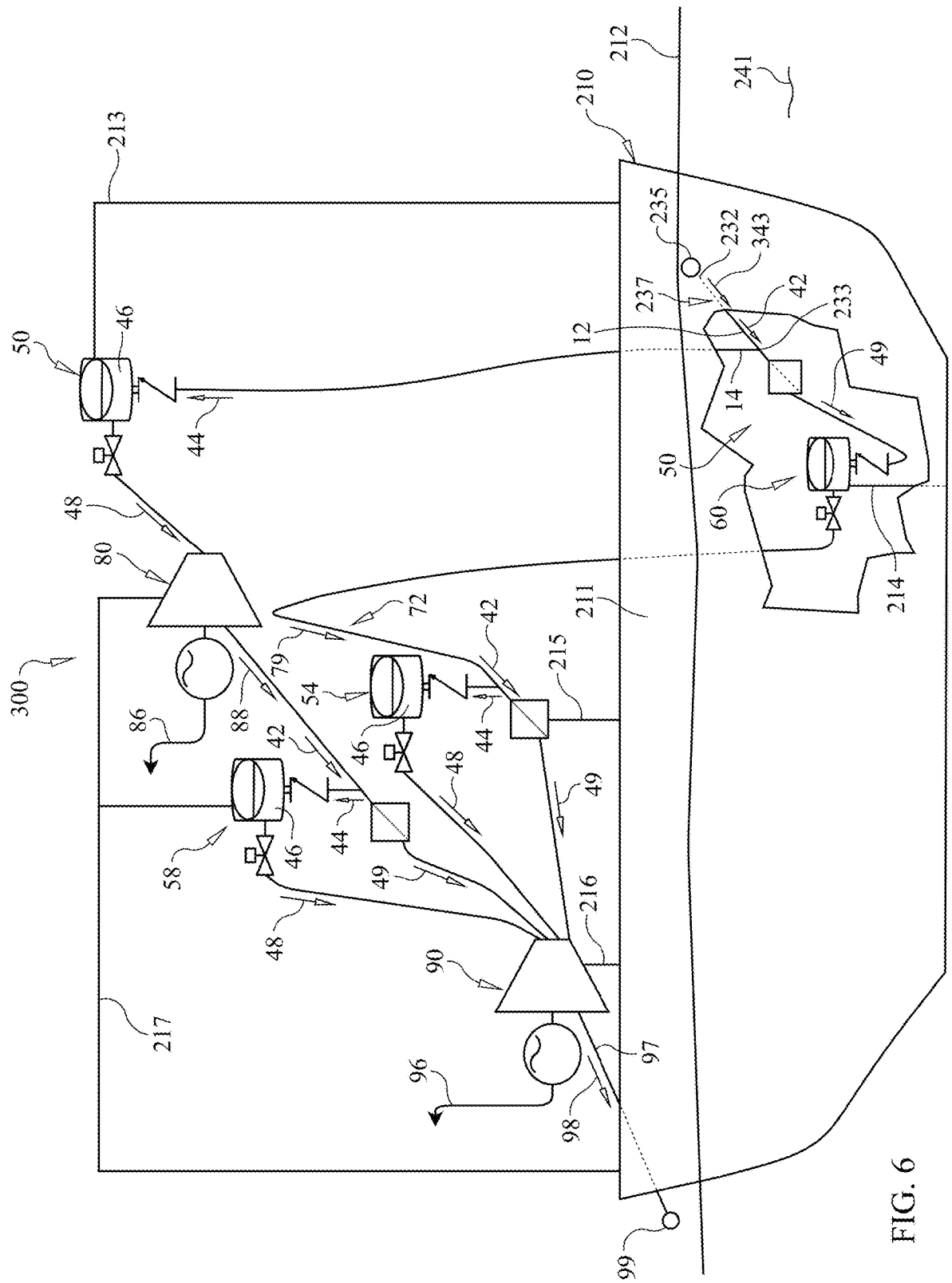
FIG. 6 shows a schematic view of a fifth embodiment of the invention in partial cutaway.

For a fourth embodiment, reflecting a containerized multi-hydram system, we refer to FIGS. 1, 2 & 5. Containerized system 300 comprises a first container assembly 310, second container assembly 330, coupling assembly 350, feedwater assembly 360, discharge line 370, primary hydram system 50, overflow pressure vessel system 60, primary hydroelectric turbine-generator system 80, secondary hydram system 54, tertiary hydram system 58, secondary hydroelectric turbine-generator system 90, and exhaust 99.

Primary hydram system 50, secondary hydram system 54, and tertiary hydram system 58, overflow pressure vessel system 60, primary hydroelectric turbine-generator system 80, secondary hydroelectric turbine-generator system 90, and exhaust 99, are each a structure according to active water system 100 above in FIG. 3, and function in the manner so described.

First container assembly 310 includes container 312, brackets 314, 315, 316, electrical connector 321, feedwater coupling 323, fluid couplings 324, 325. Brackets 314, 315, 316, respectively, support primary hydram system 50, overflow pressure vessel system 60, primary hydroelectric turbine-generator system 80, and fix them to first container assembly 310. Supports can take many forms known to persons of skill in the art, but are shown here as brackets. Electrical connector 321 connects power connection 86 to the outside of first container assembly 310. Feedwater coupling 323 connects drive pipe 12 of primary hydram system 50 to feedwater assembly 360. Fluid coupling 324 connects outlet 77 of siphon 72 of overflow pressure vessel system 60 to first coupler 352 of coupling assembly 350, and fluid coupling 325 connects spent water pipe 87 of primary hydroelectric turbine-generator system 80 to second coupler 354 of coupling assembly 350.

Second container assembly 330 includes container 332, brackets 337, 338, 339, electrical connector 341, discharge coupling 322, fluid couplings 344, 345. Brackets 337, 338, 339, respectively, support secondary hydram system 54, tertiary hydram system 58, and secondary hydroelectric turbine-generator system 90, and fix them to second container assembly 330. Supports can take many forms known to persons of skill in the art, but are shown here as brackets. Electrical connector 341 connects power connection 96 to the outside of second container assembly 330. Discharge coupling 322 connects spent water pipe 97 of secondary hydroelectric turbine-generator system 90 at exhaust 99 to discharge line 370. Fluid coupling 344 connects drive pipe 12 of secondary hydram system 54 to first coupler 352 of coupling assembly 350, and fluid coupling 345 connects drive pipe 12 of tertiary hydram system 58 to second coupler 354 of coupling assembly 350. First container assembly 310 may be conveniently supported by and mounted to, second container assembly 330, but could also be separated by an intervening structure, or be mounted above and laterally thereto.

Coupling assembly 350 includes first coupler 352, and second coupler 354. First coupler 352 connects fluid coupling 324 of first container assembly 310 to fluid coupling 344 of second container assembly 330, thus fluidly coupling outlet 77 of siphon 72 of overflow pressure vessel system 60 to drive pipe 12 of secondary hydram system 54. Second coupler 354 connects fluid coupling 325 of first container assembly 310 to fluid coupling 345 of second container assembly 330, thus fluidly coupling spent water pipe 87 of primary hydroelectric turbine-generator system 80 to drive pipe 12 of tertiary hydram system 58.

Feedwater assembly 360 is attached to feedwater coupling 323 on first containerized assembly 310 and includes marine and debris filter 362, and supplies feedwater 361 to containerized system 300. Discharge line 370 is attached to discharge coupling 322 on second containerized assembly 330, and discharges spent water 98 from containerized system 300.

In operation of containerized system 300, feedwater assembly 360 supplies feedwater 361 through marine and debris filter 362 to first container assembly 310 via feedwater coupling 323 and then to drive pipe 12 of primary hydram system 50 as intake water flow 42.

In primary hydram system 50, the process follows the description above for hydram system 10, resulting in waste water flow 49 from waste pipe 18, which is delivered to overflow inlet valve 65 of overflow pressure vessel system 60, and turbine water flow 48—at an increased pressure—from delivery pipe 16 from primary hydram system 50, which is delivered to water turbine 82 of primary hydroelectric turbine-generator system 80.

Turbine water flow 48 drives water turbine 82 and the rotationally coupled generator 84 and creates electricity which is delivered via power connection 86 and to the exterior of first container assembly 310 via electrical connector 321. Water turbine 82 discharges spent water 88 via spent water pipe 87 to second coupler 354 of coupling assembly 350 via fluid coupling 325.

In overflow pressure vessel system 60, the system follows the description above, resulting in siphoned flow 79 with a velocity head and increased kinetic energy due to gravitational acceleration down siphon 72, which is delivered to first coupler 352 of coupling assembly 350 via fluid coupling 324.

Second coupler 354 delivers spent water 88 to second container assembly 330 via fluid coupling 345 and to drive pipe 12 of tertiary hydram system 58 as intake water flow 42. First coupler 352 delivers siphoned flow 79 to second container assembly 330 via fluid coupling 344 and to drive pipe 12 of secondary hydram system 54 as intake water flow 42.

In secondary hydram system 54, the process follows the description above for hydram system 10, resulting in waste water flow 49 from waste pipe 18 and turbine water flow 48—at an increased pressure—from delivery pipe 16, which are each delivered to water turbine 92 of secondary hydroelectric turbine-generator system 90.

In tertiary hydram system 58, the process follows the description above for hydram system 10, resulting in waste water flow 49 from waste pipe 18 and turbine water flow 48—at an increased pressure—from delivery pipe 16, which are each delivered to water turbine 92 of secondary hydroelectric turbine-generator system 90.

Turbine water flows 48 and waste water flows 49 drive water turbine 92 and the rotationally coupled generator 94 and creates electricity which is delivered via power connection 96 and to the exterior of second container assembly 330 via electrical connector 341. Water turbine 92 discharges spent water 98 via spent water pipe 97 to exhaust 99.

Exhaust 99 discharges spent water 98 from second containerized assembly 330 to discharge line 370 discharge coupling 322, and then to the environment.

For a fifth embodiment, reflecting a self-priming passive water multi-hydram system that is variation of passive water system 200, we refer to FIGS. 1, 2, 4 & 6. Self-priming water system 300 comprises floating structure 210, primary hydram system 50, overflow pressure vessel system 60, primary hydroelectric turbine-generator system 80, secondary hydram system 54, tertiary hydram system 58, secondary hydroelectric turbine-generator system 90, intake assembly 237, and exhaust 99.

Primary hydram system 50, secondary hydram system 54, and tertiary hydram system 58, overflow pressure vessel system 60, primary hydroelectric turbine-generator system 80, secondary hydroelectric turbine-generator system 90, and exhaust 99, are each a structure according to active water system 100 above and in FIGS. 3 & 4, and function in the manner so described.

Floating structure 210 (which could be, e.g., a boat, barge, anchored platform) includes hull 211 floating on water 212, and supports primary hydram system 50, overflow pressure vessel system 60, primary hydroelectric turbine-generator system 80, secondary hydram system 54, tertiary hydram system 58, secondary hydroelectric turbine-generator system 90, intake assembly 237, and exhaust 99. Supports can take many forms known to persons of skill in the art, but are shown here as brackets 213, 214, 215, 216, and 217 supporting, respectively, primary hydram system 50, overflow pressure vessel system 60, secondary hydram system 54, secondary hydroelectric turbine-generator system 90, and both of primary hydroelectric turbine-generator system 80 and tertiary hydram system 58.

Intake assembly 237 includes intake 232 and outlet 233. Intake 232 is exposed to water 212 through hull 211 and protected by marine and debris filter 235, and is below the waterline (e.g. below the surface of water 212). Outlet 233 is located below intake 232 and, in turn, fluidly connects to drive pipe 12 of primary hydram system 50.

In operation of self-priming water system 300, passive water 241 enters intake 232 under natural water pressure (passing through filter 235), drops under gravity, and then delivers self-priming flow 343 to outlet 233 and intake water flow 42.

In primary hydram system 50, the process follows the description above for hydram system 10 and passive water system 200, except that a longer vertical portion of T-pipe 14 permits some components of primary hydram 50 (drive pipe 12, lateral portions of T-pipe 14, impulse valve 20, waste pipe 18) to be located lower in hull 211 and below the surface of water 212. The results are waste water flow 49 from waste pipe 18, which is delivered to overflow inlet valve 65 of overflow pressure vessel system 60, and turbine water flow 48—at an increased pressure—from delivery pipe 16 from primary hydram system 50, which is delivered to water turbine 82 of primary hydroelectric turbine-generator system 80.

Turbine water flow 48 drives water turbine 82 and the rotationally coupled generator 84 and creates electricity which is delivered via power connection 86. Water turbine 82 discharges spent water 88 via spent water pipe 87 to drive pipe 12 of secondary hydram system 54 as intake water flow 42.

In tertiary hydram system 58, the process follows the description above for hydram system 10, resulting in waste water flow 49 from waste pipe 18 and turbine water flow 48—at an increased pressure—from delivery pipe 16, which are each delivered to water turbine 92 of secondary hydroelectric turbine-generator system 90.

In overflow pressure vessel system 60, the system follows the description above, except that a longer lift pipe 73 permits most of overflow pressure vessel system 60 to be located lower in hull 211 and below the surface of water 212 (with lift point 78 and outlet 77 above the surface of water 212). The result is siphoned flow 79 flowing with a velocity head and increased kinetic energy due to gravitational acceleration down siphon 72, which is delivered to drive pipe 12 of secondary hydram system 54 as intake water flow 42.

In secondary hydram system 54, the process follows the description above for hydram system 10, resulting in waste water flow 49 from waste pipe 18 and turbine water flow 48—at an increased pressure—from delivery pipe 16, which are each delivered to water turbine 92 of secondary hydroelectric turbine-generator system 90.

Turbine water flows 48 and waste water flows 49 drive water turbine 92 and the rotationally coupled generator 94 and creates electricity which is delivered via power connection 96. Water turbine 92 discharges spent water 98 via spent water pipe 97 to exhaust 99.

Exhaust 99 discharges spent water 98 to the environment.

Figure 7:
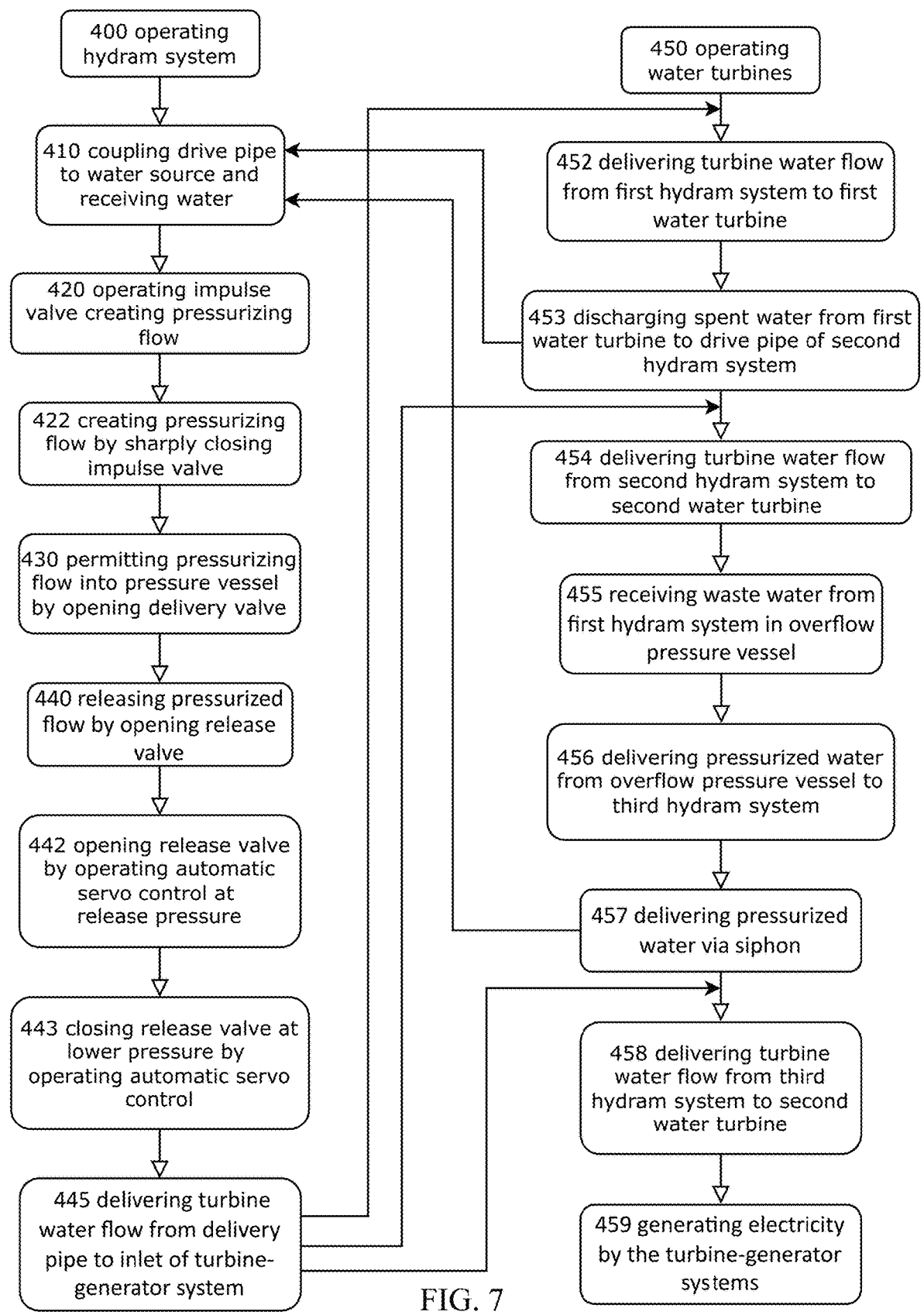
FIG. 7 shows the steps of a process for carrying out an embodiment of the invention.

Turning to FIG. 7, an embodiment of the invention includes a method of generating hydropower using a source of water.

Step 400 is operating a hydram system. Step 410 is fluidly coupling a drive pipe of at least one hydram system to a source of water and receiving the water. Step 420 is operating an impulse valve to create a pressurizing flow. Step 422 is creating a pressurizing flow by sharply closing the impulse valve. Step 430 is permitting the pressurizing flow into a pressure vessel from the drive pipe by opening a delivery valve. Step 440 is releasing a pressurized flow from the pressure vessel to a delivery pipe by opening a release valve. Step 442 is opening the release valve by operating an automatic servo control at a release pressure. Step 443 is closing the release valve at a lower pressure by operating the automatic servo control. Step 445 is delivering turbine water flow from the delivery pipe to an inlet of a turbine-generator system.

Step 450 is operating the water turbines. Step 452 is delivering turbine water flow from a first hydram system to a first water turbine. Step 453 is discharging spent water from the first water turbine to the drive pipe of the second hydram system. Step 454 is delivering turbine water flow from a second hydram system to a second water turbine. Step 455 is receiving waste water from the first hydram system in an overflow pressure vessel. Step 456 is delivering pressurized water from the overflow pressure vessel to the third hydram system. Step 457 is delivering the pressurized water via a siphon. Step 458 is delivering turbine water flow from the third hydram system to the second water turbine. Step 459 is generating electricity by the turbine-generator system(s).

The invention claimed is:

1. A hydropower system, comprising:
   at least a first and a second hydram system, each said hydram system comprising a drive pipe, a T-pipe, an impulse valve, a delivery valve, a pressure vessel, and a release valve;
   said T-pipe fluidly connecting the drive pipe to both the impulse valve and the delivery valve; and;
   said impulse valve being operational to close sharply during a flow of water from said T-pipe;
   said delivery valve being a one-way check valve operational to permit water into said pressure vessel; and
   said release valve controlling release of water from said pressure vessel; and
   a siphon fluidly connecting a waste pipe of the first hydram system to the drive pipe of the second hydram system.

2. The hydropower system of claim 1, further comprising:
   said release valve opening at a release pressure and closing at a lower pressure; and
   said release valve comprising a servo-controlled valve.

3. The hydropower system of claim 1, further comprising:
   a first water turbine and a first generator coupled to said first hydram system; and
   said release valve fluidly coupled to an input of said water turbine.

4. The hydropower system of claim 1, further comprising:
a first water turbine and a first generator coupled to said first water turbine; and
an input of said first water turbine fluidly coupled to the first hydram system.

5. The hydropower system of claim 4, further comprising:
a second water turbine and a second generator coupled to said second water turbine; and
the second hydram system fluidly coupled to an input of said second water turbine.

6. The hydropower system of claim 1, further comprising:
the waste pipe fluidly connected to the impulse valve; and
an overflow pressure vessel, comprising an overflow delivery valve, and an overflow release valve;
said waste pipe fluidly connected to said overflow delivery valve.

7. The hydropower system of claim 1, further comprising:
an overflow pressure vessel;
the overflow pressure vessel fluidly connecting an output of the first hydram system to an input of the second hydram system.

8. The hydropower system of claim 7, further comprising:
a first water turbine and a first generator coupled to said first water turbine; and
the first hydram system fluidly coupled to an input of said first water turbine.

9. The hydropower system of claim 8, further comprising:
a second water turbine and a second generator coupled to said second water turbine; and
the second hydram system fluidly coupled to an input of said second water turbine.

10. The hydropower system of claim 1, further comprising:
an overflow pressure vessel being between and, fluidly connecting, the waste pipe of the first hydram system and the siphon.

11. The hydropower system of claim 1, further comprising:
a third hydram system; and
at least a first water turbine and a second water turbine;
the delivery pipe of the first hydram system coupled to an input of said first water turbine;
the drive pipe of the third hydram system coupled to an output of said first water turbine; and
the delivery pipe of the second hydram system coupled to an input of said second water turbine; and
the delivery pipe of the third hydram system coupled to the input of said second water turbine; and
an overflow pressure vessel;
the overflow pressure vessel coupled to the first hydram system and to the drive pipe of the third hydram system.

12. The hydropower system of claim 1, further comprising:
a source pipe;
the source pipe connecting the drive pipe for the first hydram system to a low head water source.

13. The hydropower system of claim 1, further comprising:
a main siphon assembly;
the main siphon assembly comprising an intake;
the main siphon assembly connecting the drive pipe for the first hydram system to a water source via the intake.

14. A hydropower system comprising:
at least a first and a second hydram system, each said hydram system comprising a drive pipe, a T-pipe, an impulse valve, a delivery valve, a pressure vessel, and a release valve;
said T-pipe fluidly connecting the drive pipe to both the impulse valve and the delivery valve; and;
said impulse valve being operational to close sharply during a flow of water from said T-pipe;
said delivery valve being a one-way check valve operational to permit water into said pressure vessel; and
said release valve controlling release of water from said pressure vessel;
a first water turbine and a first generator coupled to said first water turbine;
an input of said first water turbine fluidly coupled to the first hydram system;
a second water turbine and a second generator coupled to said second water turbine;
the second hydram system fluidly coupled to an input of said second water turbine; and
the second hydram system fluidly coupled to an output of said first water turbine.

15. A hydropower system comprising:
at least one hydram system, said at least one hydram system comprising a drive pipe, a T-pipe, an impulse valve, a delivery valve, a pressure vessel, and a release valve;
said T-pipe fluidly connecting the drive pipe to both the impulse valve and the delivery valve; and;
said impulse valve being operational to close sharply during a flow of water from said T-pipe;
said delivery valve being a one-way check valve operational to permit water into said pressure vessel; and
said release valve controlling release of water from said pressure vessel; and
a first shipping container assembly enclosing the at least one hydram system;
the first shipping container assembly comprising a feedwater assembly;
the feedwater assembly connected to the drive pipe for the at least one hydram system.

16. The hydropower system of claim 15, further comprising:
a second shipping container assembly; and
a coupling assembly connecting the first and second shipping container assemblies;
the coupling assembly comprising fluid couplings.

17. The hydropower system of claim 15, further comprising:
a second shipping container assembly;
a first water turbine;
a first generator coupled to the first water turbine;
a second hydram system; and
a second water turbine coupled to the second hydram system; and
a second generator coupled to the second water turbine; and
the first shipping container assembly further enclosing the first water turbine and the first generator; and
the second shipping container assembly enclosing the second hydram system, the second water turbine, and the second generator.

18. A hydropower system for providing pressurized water from a supply of flowing water, comprising:

at least a first, a second, and a third hydram system, each having a drive pipe, and each having a delivery pipe and a waste pipe;

a first and a second water turbine, each having a fluid inlet and fluid outlet; and the delivery pipe of the first hydram system fluidly connected to the fluid inlet of the first turbine, and the waste pipe of the first hydram system fluidly connected to the drive pipe of the second hydram system;

the first water turbine fluidly connected between the delivery pipe of the first hydram system and the drive pipe of the third hydram system; and the fluid inlet of the second water turbine fluidly connected to the delivery pipe of the second hydram system.

19. The hydropower system of claim 18, further comprising:

the fluid inlet of the second water turbine fluidly connected to the delivery pipe of the third hydram system.

20. The hydropower system of claim 19, further comprising:

the fluid inlet of the second water turbine fluidly connected to the waste pipes of the second and third hydram systems.

21. The hydropower system of claim 18, further comprising:

an overflow pressure vessel having an overflow inlet and overflow outlet;

said overflow pressure vessel fluidly connected between the waste pipe of the first hydram system and the drive pipe of the second hydram system.

22. A method of generating hydropower using a source of water and the hydropower system of claim 1, comprising:

fluidly coupling the drive pipe of the first hydram system to a source of water;
    the first hydram system further comprising a delivery pipe; and operating the impulse valve to create a pressurizing flow;

permitting the pressurizing flow into the pressure vessel from the drive pipe by opening the delivery valve;

releasing a pressurized flow from the pressure vessel to the delivery pipe by opening a release valve; and delivering turbine water flow from the delivery pipe to an inlet of a turbine-generator system.

23. The method of claim 22, further comprising:

the drive pipe fluidly connected between the source of water and the impulse valve;

the delivery valve fluidly connected between the impulse valve and the pressure vessel; and the delivery pipe fluidly coupled to the inlet of the turbine-generator system.

24. The method of claim 22:

the step of creating a pressurizing flow comprising sharply closing the impulse valve.

25. The method of claim 22:

the step of opening the release valve comprising operating an automatic servo control at a release pressure; and further comprising closing the release valve at a lower pressure.

26. The method of claim 22, further comprising;

at least a first and second water turbine;

delivering turbine water flow from the first hydram system to the first water turbine; and delivering turbine water flow from the second hydram system to the second water turbine.

27. The method of claim 26, further comprising;

discharging spent water from the first water turbine to the drive pipe of a third hydram system.

28. The method of claim 26, further comprising;

receiving waste water from the first hydram system in an overflow pressure vessel; and delivering pressurized water from the overflow pressure vessel to the second hydram system via the siphon.

29. The method of claim 26;

the step of delivering pressurized water to the second hydram system comprising siphoning.

30. The method of claim 22, further comprising;

a third hydram system; and at least a first and second water turbine;

delivering turbine water flow from the first hydram system to the first water turbine;

discharging spent water from the first water turbine to the drive pipe of the third hydram system;

delivering turbine water flow from the second hydram system to the second water turbine;

receiving waste water from the first hydram system in an overflow pressure vessel; and delivering pressurized water from the overflow pressure vessel to the second hydram system.

* * * * *